No. 732,623. PATENTED JUNE 30, 1903.
R. B. ELISON.
STALK CUTTER AND CRUSHER.
APPLICATION FILED JAN. 22, 1903.
NO MODEL. 2 SHEETS—SHEET 2.
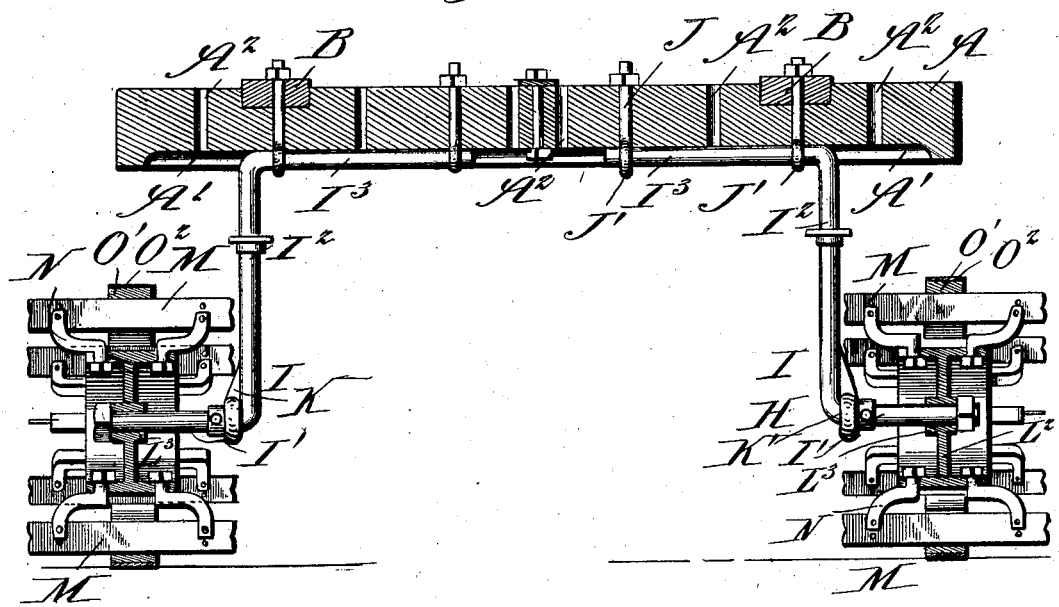

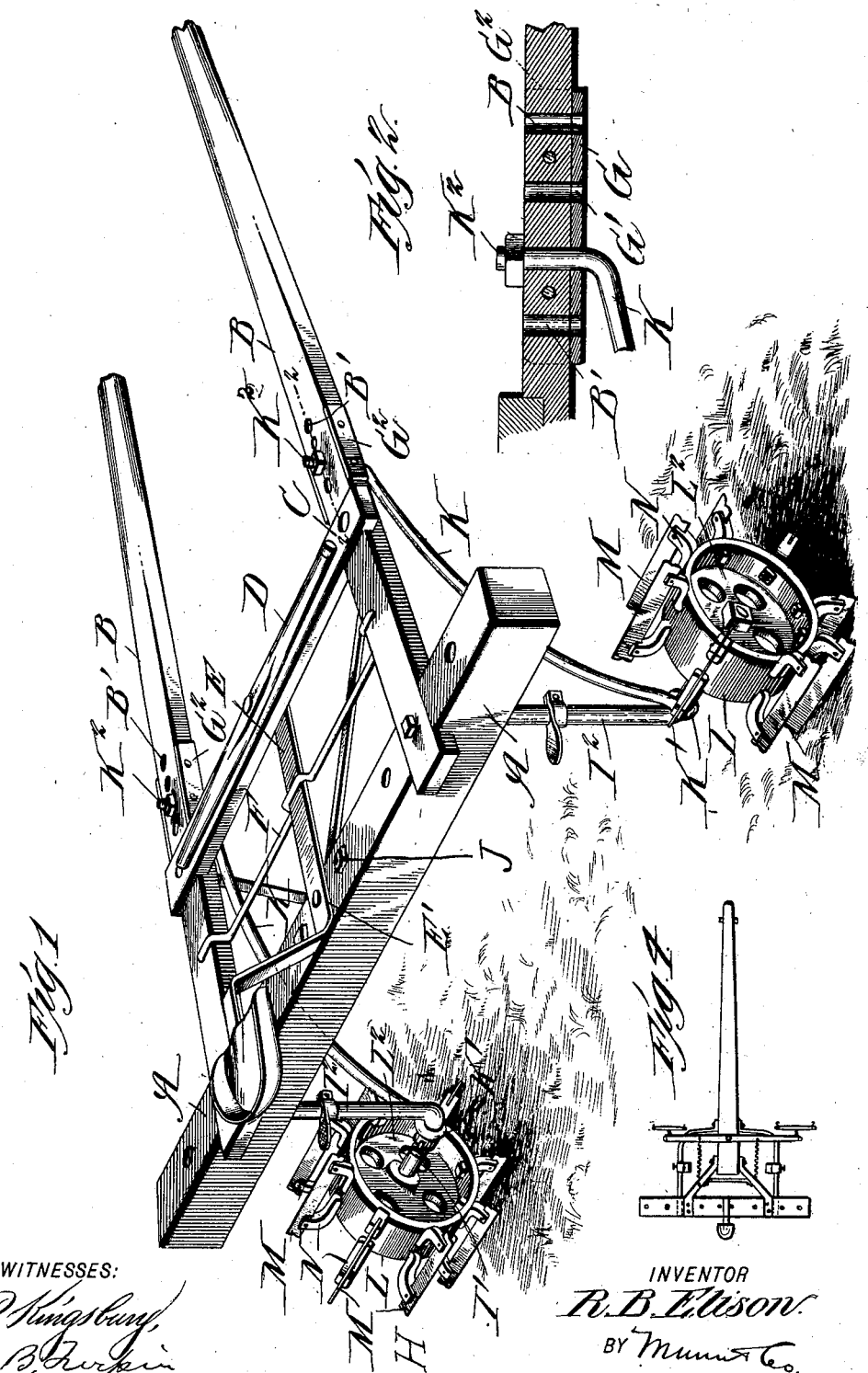

No. 732,623. Patented June 30, 1903.

UNITED STATES PATENT OFFICE.

ROBERT B. ELISON, OF MORVEN, GEORGIA, ASSIGNOR OF ONE-HALF TO JAMES M. SCARBER, OF MORVEN, GEORGIA.

STALK-CUTTER AND CRUSHER.

SPECIFICATION forming part of Letters Patent No. 732,623, dated June 30, 1903.

Application filed January 22, 1903. Serial No. 140,107. (No model.)

*To all whom it may concern:*

Be it known that I, ROBERT B. ELISON, a citizen of the United States, and a resident of Morven, in the county of Brooks, in the State of Georgia, have made certain new and useful Improvements in Stalk-Cutters and Crushers, of which the following is a specification.

My invention is an improvement in stalk-cutters and clod-crushers, and has for an object to provide a simple novel construction whereby to cut up cotton and other stalks and for crushing or chopping up new ground after it has been plowed up or broken up; and the invention consists in certain novel constructions and combinations of parts, as will be hereinafter described and claimed.

In the drawings, Figure 1 is a perspective view of an implement embodying my invention. Fig. 2 is a detail longitudinal section on about line 2 2 of Fig. 1. Fig. 3 is a vertical transverse section drawn through the top beam and through the opposite wheels; and Fig. 4 shows a tongue instead of a pair of shafts, as shown in Fig. 1.

By my invention I seek to provide a machine or implement which can be readily used to cut up stalks and the like and also to put ground in condition for planting.

In carrying out my invention I employ a top beam A, to which are fixed the shafts B, which are connected in advance of the beam A by the shaft-bar C, carrying the whiffletree D. The seat-bar E is fixed at E' to the top beam and extends thence forward beneath a cross-brace rod F and is secured at its front end to the under side of the shaft-bar C, as will be understood from Fig. 1.

The shafts B are provided with holes B', preferably arranged in a series extending in the direction of length of the shafts, and the portions of the shafts perforated by the holes B' are braced and strengthened by the plates G, fitted beneath the shafts and perforated at G' in line with the holes B' and provided with side plates or flanges $G^2$, which extend along the opposite sides of the shafts, as will be understood from Figs. 1 and 2 of the drawings.

The wheels H are carried on the arms I' of the crank-axles I, such axles I having the main or connecting portions $I^2$, which extend between the arms I' and the top arms $I^3$, which latter fit within a longitudinal groove A', formed in the under side of the top beam A, as best shown in Fig. 3. These top arms or bars $I^3$ are secured within the groove A' by means of the eyebolts J, whose eyes J' receive the rods $I^3$, the said bolts J extending upwardly through suitable holes $A^2$ in the beam and secured by suitable nuts, as shown. As shown, I employ one of the bolts J at each side for securing the shafts B to the top beam A, and I also provide a number of the holes $A^2$, so the arms $I^3$ can be adjusted longitudinally within the groove A' and secured in any adjustment for the purpose of varying the gage of the machine. By this means the machine may be set to cut rows of different widths apart.

Brace-rods K connect at their rear ends with the arms I' preferably by forming the said brace-rods with eyes K', receiving the said arms, as shown in Fig. 1, and extend thence forwardly and are provided at their front ends with shanks $K^2$, which extend upwardly through the holes B' in the shafts and are secured by nuts, as shown in Figs. 1 and 2. By this construction the brace-rods K may swing at their front ends to permit the adjustment of the wheels out or in and at the same time form draft connections which brace the wheels and their crank-axles and hold the wheels steadily to place.

The wheels H are of a special construction, comprising the body portion L, blades M, and the brackets N, connecting said blades with the rim L' of the body L. This body L has a rim and web $L^2$ and a hub $L^3$, the web being of sufficient thickness to form with the hub and rim a strong firm support for the brackets N, which carry the blades M. The brackets N are provided at one end with threaded studs which extend through the rim of the body L and receive nuts at their inner ends and extend outwardly from said studs and are provided at their outer upturned ends $N^3$ with slots $N^4$, in which the blade M is secured by bolts, as shown. The blades M are double-edged, having cutting edges at their opposite edges, so the said blades can be readily reversed whenever desired.

In Fig. 1 I show the blades of the wheels exposed ready for use, while in Fig. 3 I show the tire O applied to the blades, so the implement can be transported from place to place without wearing or injuring the blades. This tire O may preferably consist of an inner wooden portion O' to slip on the wheels over the blades and an outer strip $O^2$ of metal having its ends bolted together. I thus provide an implement which can be readily transported from place to place without injuring the blades and can be quickly adjusted for use and set to chop rows any suitable distance apart.

When desired, the machine may be supplied with a tongue, as shown in Fig. 4, instead of with shafts.

Having thus described my invention, what I claim as new, and desire to secure by Letters Patent, is—

1. The improved machine herein described comprising the top beam provided in its under side with a longitudinal groove and having bolt-holes formed through it at intervals and leading to said groove, the shafts secured to the top beam and provided each with a longitudinal series of bolt-holes, the plates fitting against said shafts and having holes in register with the bolt-holes therein and side plates lapping alongside the shafts, the crank-axles having top bars fitting in the groove of the top beam, upright connecting-bars and spindle-arms extending therefrom, the eyebolt having eyes receiving the top bars of the crank-axles and extending through the bolt-holes in the top beam and secured, the draft-rods having at their rear ends eyes encircling the spindle-arms of the crank-axles and provided at their front ends with shanks extending through the holes in the shafts and secured, and the wheels secured on the crank-axles and having blades substantially as and for the purposes set forth.

2. The combination with the top beam and the shafts provided with a longitudinal series of bolt-holes and with the plates for bracing the shafts adjacent to said bolt-holes, of the crank-axles having spindle-arms and wheels thereon and provided with top rods, means securing said top rods to the top beam, and the draft-rods connected at their rear ends with the crank-axles and fitting at their front ends in the bolt-holes of the shafts and adjustable substantially as and for the purposes set forth.

ROBERT B. ELISON.

Witnesses:
E. H. PIKE,
S. L. HALL.